United States Patent

Pettitt et al.

Patent Number: 6,040,876
Date of Patent: Mar. 21, 2000

[54] LOW INTENSITY CONTOURING AND COLOR SHIFT REDUCTION USING DITHER

[75] Inventors: Gregory S. Pettitt, Rowlett; Vishal Markandey, Dallas, both of Tex.

[73] Assignee: Texas Instruments Incorporated, Dallas, Tex.

[21] Appl. No.: 08/729,121

[22] Filed: Oct. 11, 1996

Related U.S. Application Data

[60] Provisional application No. 60/005,195, Oct. 13, 1995.

[51] Int. Cl.⁷ ...................................................... H04N 5/21
[52] U.S. Cl. ............................ 348/624; 348/612; 348/618; 348/574; 348/627
[58] Field of Search .............................. 345/136; 382/167, 382/275; 358/533, 519, 454, 463, 518, 457; 348/607, 27, 618, 574, 624, 627, 612, 615; 341/155, 131; H04N 5/14, 5/21

[56] References Cited

U.S. PATENT DOCUMENTS

| | | | |
|---|---|---|---|
| 4,959,730 | 9/1990 | Tai et al. .................................. | 358/465 |
| 5,083,210 | 1/1992 | Reilly et al. ............................. | 358/457 |
| 5,404,176 | 4/1995 | Lum ......................................... | 348/574 |
| 5,525,984 | 6/1996 | Bunker ..................................... | 348/574 |
| 5,557,429 | 9/1996 | Hirose ...................................... | 358/463 |
| 5,598,482 | 1/1997 | Balasubramanian et al. .......... | 382/270 |

*Primary Examiner*—Sherrie Hsia
*Attorney, Agent, or Firm*—Charles A. Brill; Frederick J. Telecky, Jr.; Richard L. Donaldson

[57] ABSTRACT

A method and system for reducing the effects of false contouring and reducing color shading artifacts. An image signal 102 is dithered by the addition of a small noise signal from a noise generator 500. The added noise signal breaks up the edges of homogenous blocks of pixels, causing the created image to appear to have a smooth transition from one region to the next. The image dithering is especially useful in digital color image displays where processing performed on the chrominance portion of the image signal often causes quantization errors which lead to sharp transitions between similar shades when the input image included a smooth transition.

7 Claims, 3 Drawing Sheets

6,040,876

LOW INTENSITY CONTOURING AND COLOR SHIFT REDUCTION USING DITHER

This application claims priority under 35 U.S.C. § 119 (c) (1) of provisional application number 60/005,195, filed Oct. 13, 1995.

FIELD OF THE INVENTION

This invention relates to the field of image display systems, more particularly to methods and systems for reducing artifacts caused by quantization errors in digital display systems.

BACKGROUND OF THE INVENTION

Display systems create visual images from an electrical input image signal. Digital display systems, which use a quantized image signal, have many advantages when compared to the typical analog display system, including increased image rendition accuracy and the prospect of low-cost high-definition television implementation. However, without proper consideration for representation of the image's dynamic range, a digital system can induce new artifacts. Digital display systems can only display a finite number of intensity levels because the image data is quantized. Displaying an image using only a finite number intensity levels can detract from the overall image quality, causing visual artifacts such as false contouring or color shifting.

False contouring occurs when the quantization of an image signal causes contours to appear in an output image that do not exist in the input image. For example, the image of a smooth ball has a gradual color or intensity gradient. When the analog input is quantized, the smooth image gradient may be transformed into several large blocks of adjacent pixels, wherein each pixel in a block is assigned an identical image signal value. If these large blocks of adjacent pixels are not separated by a region of non-homogenous pixels, the blocks will cause a "stair-step" effect and the smooth curve of the original image will appear to be a series-of single-color flat surfaces.

Color shifting is a similar problem that occurs when the jumps in quantization levels do not occur at the same signal level for each color. For example, if the quantization levels are set so that the green component turns on first, followed by the red and blue components, a gray pixel will turn green, then yellow, before finally turning the desired gray. While color shifting is most evident when a pixel is initially turned on, as in the example above higher intensity pixels may have perceptible changes in color as the three color signals individually increment.

False contouring and color shifting artifacts may be increased by each quantizing or digital processing process including MPEG encoding or decoding, and de-gamma processing. A solution to the false contouring and color shifting problem is needed that does not significantly drive up the display system cost.

SUMMARY OF THE INVENTION

According to one embodiment of the present invention, a method of reducing visual artifacts in an image display is provided. The method is implemented by dithering one or more signal components in an image signal. The dithering reduces the image contouring, which is caused by quantization errors, that will occur when the image is displayed. Digital color images are most susceptible to false color contouring. Therefore, the disclosed method may have its greatest impact when applied to the chrominance portion of a digital color image signal.

According to another embodiment of the present invention, a system for reducing visible artifacts in an image display is provided. The system includes a noise generator which adds a noise signal to the image signal. The added noise signal has the effect of breaking up the sharp transitions between adjacent image shades, causing the displayed image to appear to represent the source image more accurately.

The present invention has the advantage of decreasing the effects of quantization errors without adding significant cost or complexity to the display system.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A solution to the false contouring and color shifting problems, which does not require increasing the resolution of the display system, involves injecting controlled random noise into the signal path to break-up the large blocks of homogenous pixels which cause false contouring and color shifting.

Figure 1:
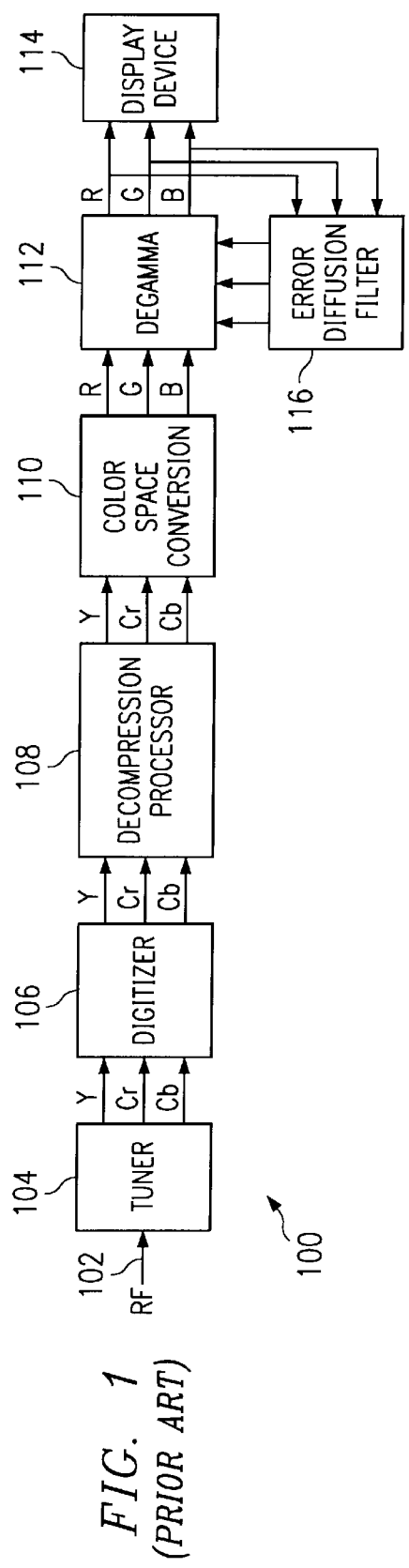
FIG. 1 is a block diagram of a digital color display system.

FIG. 1 is a block diagram of a portion of a digital display system 100 of the prior art. In FIG. 1, a radio frequency (RF) television broadcast signal 102 is received by tuner 104. Tuner 104 down-converts the television broadcast signal 102 and separates the down-converted signal into luminance (Y) and chrominance components (Cr, Cb). The digital display system 100 shown could easily be modified to receive a baseband signal or component image signal depending on the desired image source.

After the television broadcast signal has been down-converted and separated, the image signal components are digitized by one or more analog-to-digital converters in digitizer 106. If necessary, the digital image signal is decoded or decompressed by optional decompression processor 108, which extracts image data from an encoded image signal. For example, the television broadcast signal 102 may be compressed using the MPEG or Px64 compression schemes, or any other encoding or compression scheme. A color space converter 110 converts the luminance (Y) and chrominance (C) portions of the decoded digital data into a red (R), green (G), and blue (B) component image signal (ROB). The ROB data is ready to be displayed on a cathode ray tube (CRT) or similar display device 114.

Broadcast television signals are gamma corrected to compensate for the non-linear display transfer function of a CRT.

Figure 2:
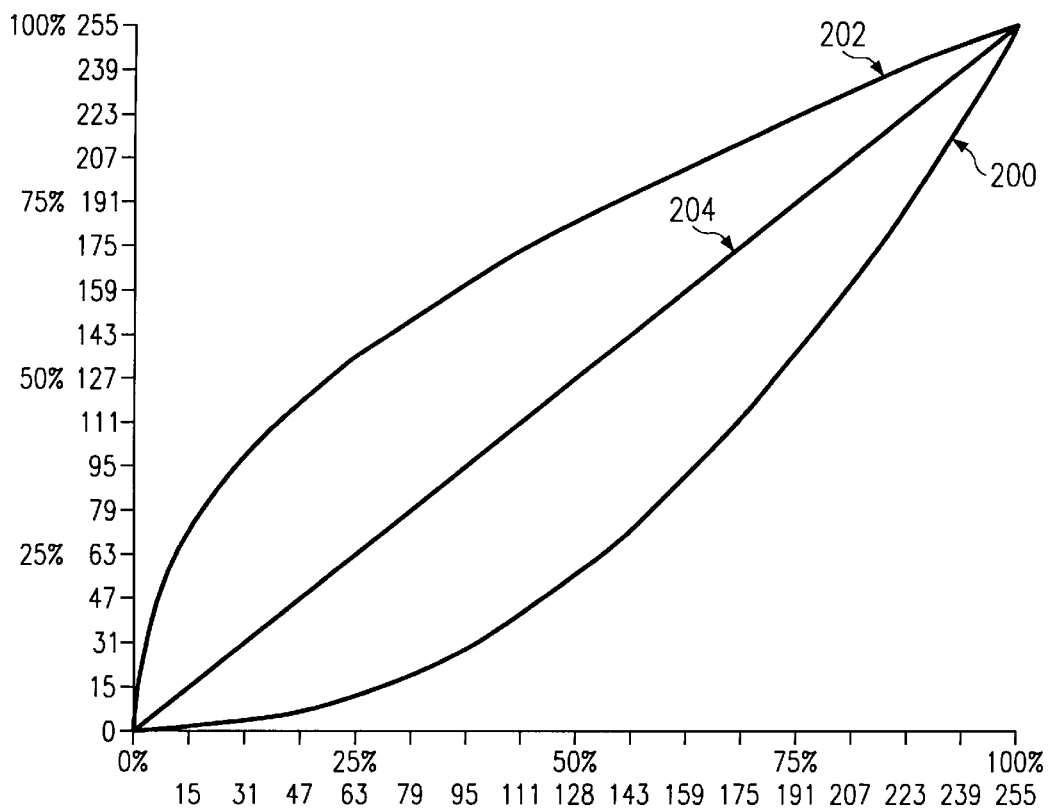
FIG. 2 is a plot of a display transfer function for a typical cathode ray tube (CRT) display, a linear display device, and a television broadcast signal.

FIG. 2 shows the display response function of a CRT display 200, a television broadcast signal 202, and a linear display device 204. In FIG. 2, the input signal magnitude is on the horizontal axis and the output signal magnitude is on the vertical axis. Each axis is labeled as a percentage of full scale and also as the decimal equivalent of an 8-bit binary number with 255 representing full scale. The CRT response function 200 is approximately equal to $Y=X^{2.2}$. The broadcast signal response function 202, is approximately equal to $Y=X^{1/2.2}$. Television broadcast systems multiply a linear input signal by the television broadcast signal response function 202 so that when the signal is displayed by a display device 114, which has a CRT display response function 200, the recreated image will represent the input image accurately.

If the image signal is to be displayed on a display device 114 that has a linear luminance transfer function, the image signal must be processed to remove the gamma compensation. Ideally, the degamma compensation is performed prior to digitizing the image signal. However, an accurate analog degamma converter may increase the cost and complexity of the system. Furthermore, while the degamma processing is performed on RGB data, the progressive scan processing is performed using digital data in luminance/chrominance format. Therefore, to minimize the system cost, the luminance/chrominance image data is digitized and a digital degamma circuit 112, as shown in FIG. 1, is used to remove the gamma compensation from the digitized image signal after the conversion to RGB format. Degamma circuit 112 often is merely a lookup table for converting a digital input word to a degamma output word.

One problem introduced by the degamma circuit 112 is the problem of quantization errors. Quantization errors also are introduced by the digitizer circuit 106, the decompression processor 108, and to a lesser extent by the color space conversion function 110. Degamma quantization errors are especially noticeable when they occur with signals which have a low brightness level because the degamma response function 200 causes a large number of the input codes to translate to the same output code, and also because when the output code is finally incremented, in response to a gradually increasing input signal, it represents a large percentage increase in the output signal.

Figure 3:
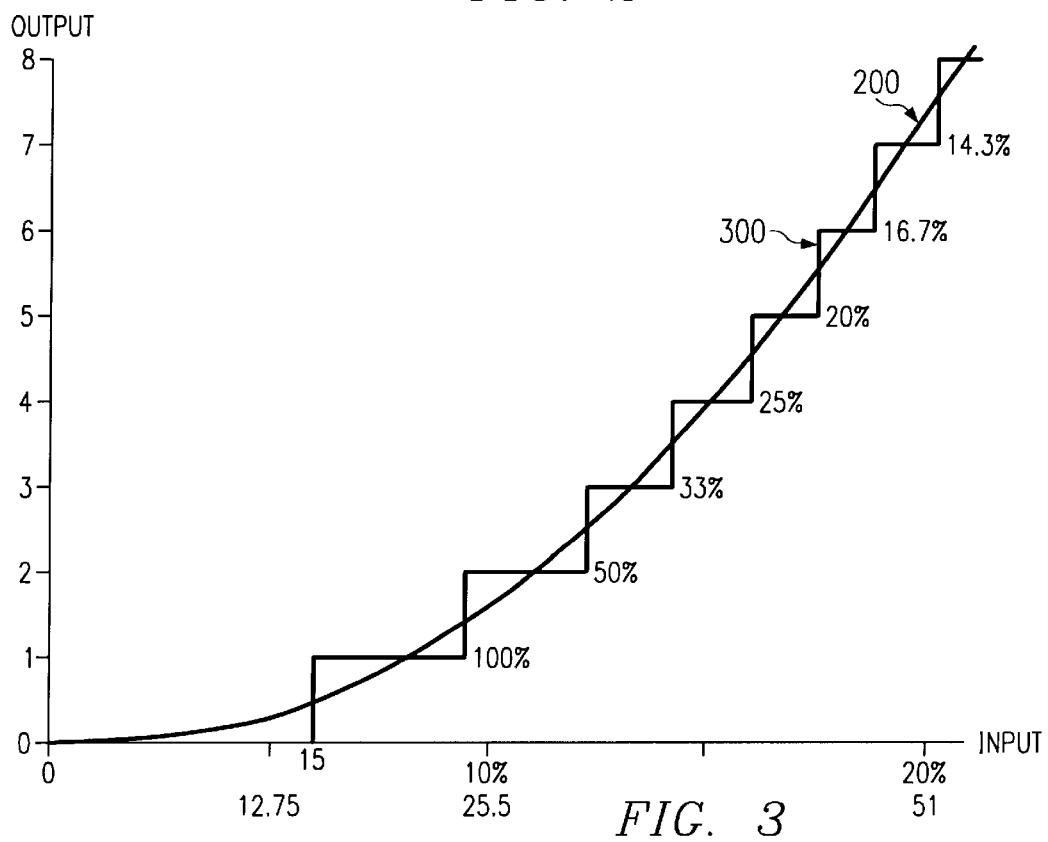
FIG. 3 is a plot of a portion of a digital degamma function showing a region having the greatest potential for quantization error.

For example, if an input signal represents an image having a low brightness level, the broadcast signal response function 202 will convert a small increase in the input signal into a large increase in the output signal. For an input signal representing an image with a high brightness level, the broadcast response function 202 will convert the same small increase in the input signal into a smaller increase in the output signal. To correct for the broadcast signal compensation, the digital degamma response function 300, a portion of which is shown in FIG. 3, must convert many input codes into the same output code. The degamma response function 300 of FIG. 3 converts decimal inputs 0 through 14 to output code 0, input codes 15 through 25 to output code 1, and input codes 25 through 31 to output code 2. As mentioned above, this translation not only introduces quantization errors, but also results in large percentage jumps in magnitude as shown in FIG. 3.

The ideal solution to the problem of reducing quantization errors and the resulting false-contouring or color shifting artifacts is to increase the resolution of the output image until the quantization levels are so small that the false-contouring and color shifting that does occur is beneath the perceptual threshold of the human viewer. However, increasing the resolution of the digital image signal requires a proportional increase in processing throughput and memory, both of which increase the cost of the display system. Additionally, spatial light modulators which sequen-tially display each bit of image data, such as the digital micromirror device, may not have a fast enough response time to display the least significant bits (LSB) of the high resolution signal.

Error diffusion is a scheme that reduces the quantization errors without significantly increasing the cost of the display system. Error diffusion, as taught by U.S. Pat. No. 5,623,281, issued Apr. 22, 1997 and entitled "Error Diffusion Filter for DMD Display" and U.S. Pat. No. 5,726,718, issued Mar. 10, 1998, and entitled "Error Diffusion Filter for DMD Display," can be used to allow a digital data word to be truncated without completely losing the information from the least significant bits that are truncated. One example of the application of error diffusion to a digital display system is shown in FIG. 4.

Figure 4:
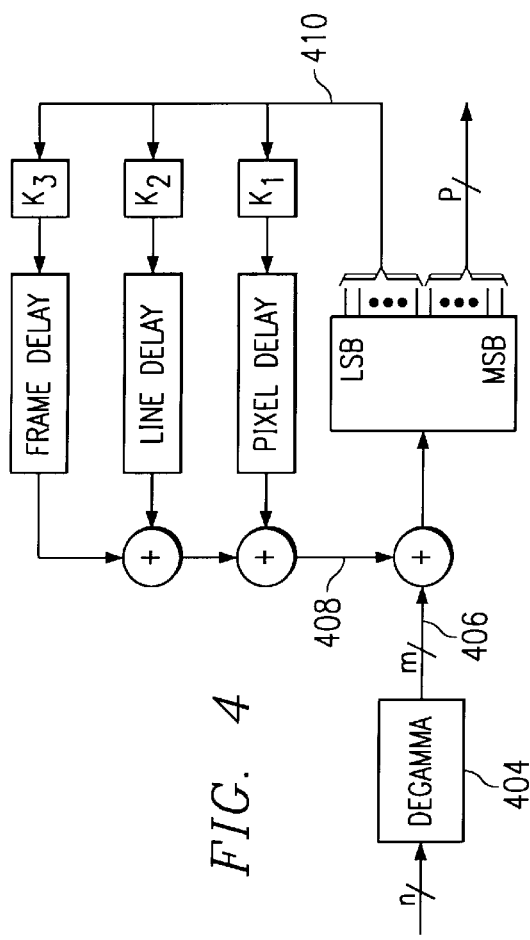
FIG. 4 is a block diagram of one embodiment of an error diffusion filter as shown in FIG. 1.

In FIG. 4, an n-bit data word is input into a degamma circuit 404. The degamma circuit 404 outputs an m-bit output word 406, where m is greater than n, representing the gamma corrected data. The m-bit output word 406 is added to a cumulative error signal 408 and the least significant bits are truncated while the most significant p-bits are output to the next circuit block. Typically p is equal to n so that the output word has the same resolution as the input word.

The truncated bits, which represent a round-off error 410, are used to generate a cumulative error signal for later data words. The cumulative error signal is generated by applying a portion of the round-off error to several nearby pixels so that the average of the pixels more closely approximates the original m-bit data words. For example, FIG. 4 shows dividing the round-off error 410 into three portions and adding a first portion to the next pixel on the same line, a second portion to the same pixel on the next line, and a third portion to the same pixel in the next frame.

Although the previous description of a digital display system has discussed the signal flow with respect to FIG. 1, it is understood that various portions of the signal path may be reordered or altered without changing the overall effect of the system.

Figure 5:
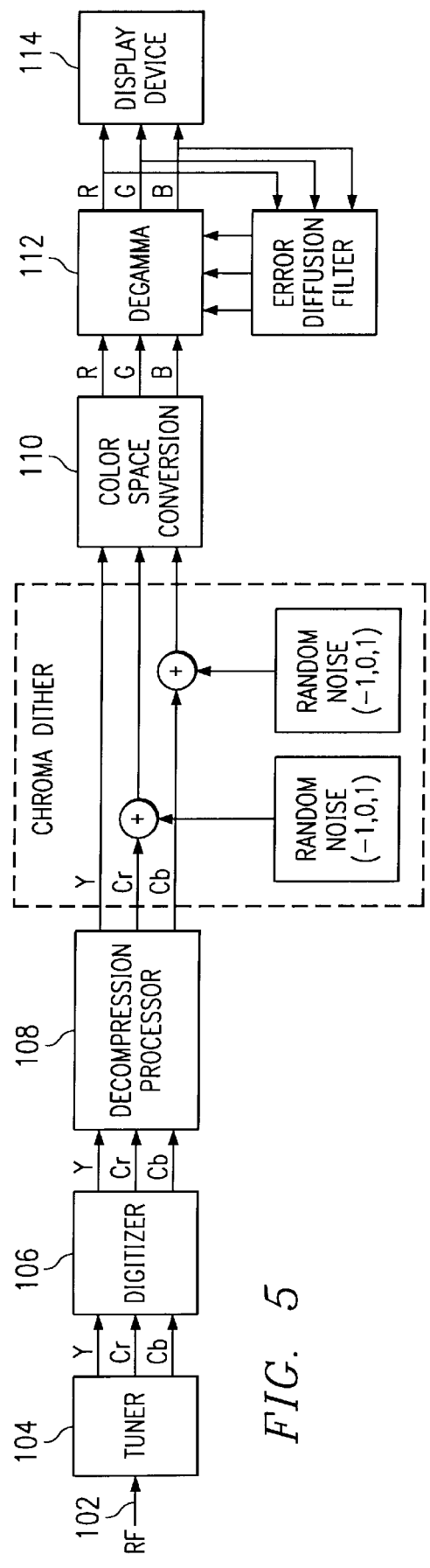
FIG. 5 is a block diagram of a digital color display system including a chroma dither circuit according to the present invention.

According to one embodiment of the present invention, as shown in FIG. 5, two random noise generators 500 or pseudo-random noise generators, are used to add a small amount of noise to the decompressed component image signals. THE process of adding a noise, or pseudo-noise signal to the image signal is called dithering. Typically, the input component image signals have been digitized and decompressed prior to adding the random noise. If the input component image signal has been quantized prior to adding noise to it, a ±1 LSB (+1, 0, −1) noise value is typically sufficient. A higher noise signal may be used, and in some cases may be desired. But, while increasing the magnitude of the noise signal further suppresses false contouring, the additional noise reduces the overall system image quality. If the input component image signal has not been quantized, a random noise signal less than 1 LSB may be used.

Preferably, a new random noise value is chosen by each of the random noise generators for each pixel of image data. Changing the random noise values at a slower rate, the effectiveness of the dithering is reduced, and additional artifacts may be introduced into the image signal path. If the image data in is 4:2:2 luma/chroma format, in which the data for each pixel alternately includes only one of the two chrominance values, $C_r$ and $C_b$, a single noise generator, generating a new noise value for each pixel, may be used without reducing the effect of the dithering or introducing additional artifacts.

Figure 6:
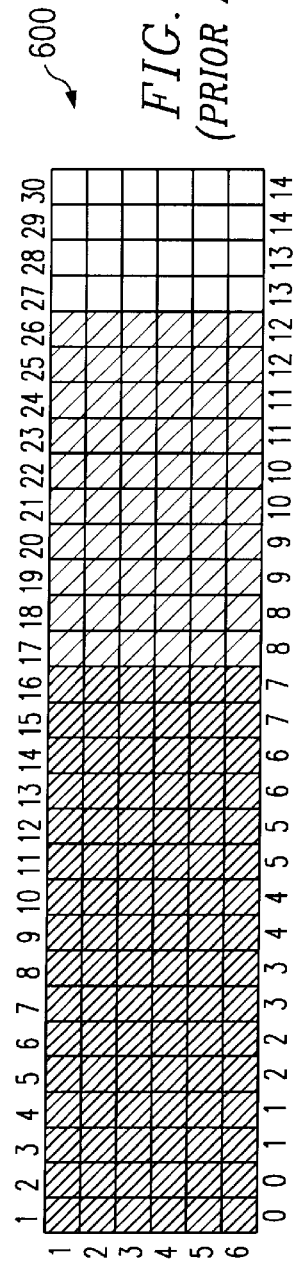
FIG. 6 is a plan view of an array of image pixels showing the effects of false contouring.

FIG. 6 shows the red channel response produced by a prior art display system similar to the display system 100 shown in FIG. 1. The image in FIG. 6 represents a yellow "ramp" which increases in brightness from left to right. Each of the six lines in the array of FIG. 6 receives the identical image data. Table 1 shows the input data, in luminance/chrominance format, as well as the same data in RGB format after the color space conversion operation, for one row of the array 600. Table 2 lists the red channel output data for array 600 as an intensity value, while FIG. 6 visually represents the same red channel output data as three unique levels of shading.

TABLE 1

| Pixel | Input Data | | | Output Data | | |
|---|---|---|---|---|---|---|
| No. | Y | Cr | Cb | Red | Green | Blue |
| 1 | 19 | 128 | 126 | 0 | 0 | 0 |
| 2 | 19 | 128 | 126 | 0 | 0 | 0 |
| 3 | 19 | 128 | 126 | 0 | 0 | 0 |
| 4 | 20 | 128 | 126 | 0 | 0 | 0 |
| 5 | 20 | 128 | 126 | 0 | 0 | 0 |
| 6 | 21 | 128 | 125 | 0 | 0 | 0 |
| 7 | 21 | 128 | 125 | 0 | 0 | 0 |
| 8 | 21 | 128 | 125 | 0 | 0 | 0 |
| 9 | 22 | 129 | 125 | 0 | 0 | 0 |
| 10 | 22 | 129 | 125 | 0 | 0 | 0 |
| 11 | 22 | 129 | 124 | 0 | 0 | 0 |

TABLE 1-continued

| Pixel | Input Data | | | Output Data | | |
|---|---|---|---|---|---|---|
| No. | Y | Cr | Cb | Red | Green | Blue |
| 12 | 23 | 129 | 124 | 0 | 0 | 0 |
| 13 | 23 | 129 | 124 | 0 | 0 | 0 |
| 14 | 24 | 129 | 124 | 0 | 0 | 0 |
| 15 | 24 | 129 | 123 | 0 | 0 | 0 |
| 16 | 24 | 129 | 123 | 0 | 0 | 0 |
| 17 | 25 | 129 | 123 | 1 | 1 | 0 |
| 18 | 25 | 129 | 123 | 1 | 1 | 0 |
| 19 | 25 | 129 | 123 | 1 | 1 | 0 |
| 20 | 26 | 129 | 122 | 1 | 1 | 0 |
| 21 | 26 | 129 | 122 | 1 | 1 | 0 |
| 22 | 27 | 129 | 122 | 1 | 1 | 0 |
| 23 | 27 | 129 | 122 | 1 | 1 | 0 |
| 24 | 27 | 129 | 121 | 1 | 1 | 0 |
| 25 | 28 | 129 | 121 | 1 | 1 | 0 |
| 26 | 28 | 129 | 121 | 1 | 1 | 0 |
| 27 | 29 | 129 | 121 | 2 | 2 | 0 |
| 28 | 29 | 129 | 121 | 2 | 2 | 0 |
| 29 | 29 | 129 | 120 | 2 | 2 | 0 |
| 30 | 30 | 129 | 120 | 2 | 2 | 0 |

TABLE 2

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 2 | 2 | 2 | 2 |
| 2 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 2 | 2 | 2 | 2 |
| 3 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 2 | 2 | 2 | 2 |
| 4 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 2 | 2 | 2 | 2 |
| 5 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 2 | 2 | 2 | 2 |
| 6 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 2 | 2 | 2 | 2 |

Figure 7:
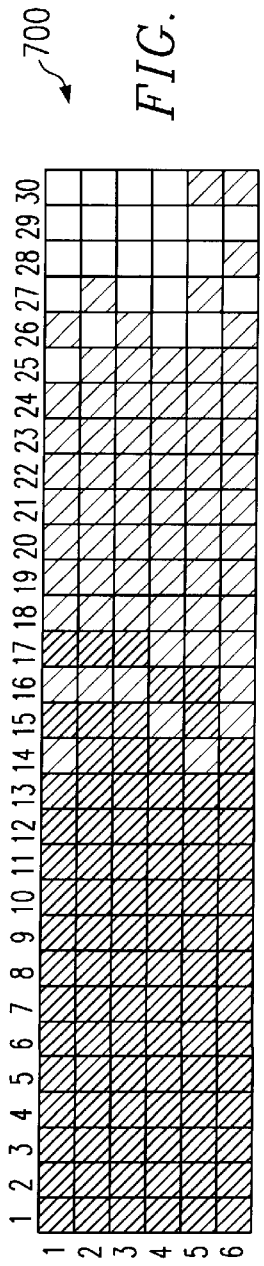
FIG. 7 is a plan view of the array of image pixels from FIG. 6 where the image data has been dithered according to one embodiment of the present invention.

FIG. 7 shows a 6×30 array 700 of pixel displaying the same red channel response as FIG. 6, except that ±1 LSB of noise has been added to the input data prior to performing the color space conversion. Because of the added noise, the sharp transition that occurred between columns 16 and 17 of FIG. 6 has been distributed over a four column region from column 14 through column 17. Likewise, the transition that occurred between columns 26 and 27 in FIG. 6 is spread from column 25 through column 30. Table 3 lists the input image data in luma/chroma format, the added noise, and the dithered data values, in both luma/chroma and RGB formats, for the last row of data from FIG. 6. Table 4 lists the displayed data for each pixel of FIG. 7.

TABLE 3

| Pixel | Input Data | | | Noise | | Dithered Data | | | RGB Data | | |
|---|---|---|---|---|---|---|---|---|---|---|---|
| No. | Y | Cr | Cb | Cr | Cb | Y | Cr | Cb | R | G | B |
| 1 | 19 | 128 | 126 | +1 | −1 | 19 | 129 | 125 | 0 | 0 | 0 |
| 2 | 19 | 128 | 126 | −1 | −1 | 19 | 127 | 125 | 0 | 0 | 0 |
| 3 | 19 | 128 | 126 | 0 | 0 | 19 | 128 | 126 | 0 | 0 | 0 |
| 4 | 20 | 128 | 126 | +1 | −1 | 20 | 129 | 125 | 0 | 0 | 0 |
| 5 | 20 | 128 | 126 | 0 | +1 | 20 | 128 | 127 | 0 | 0 | 0 |
| 6 | 21 | 128 | 125 | +1 | −1 | 21 | 129 | 124 | 0 | 0 | 0 |

TABLE 3-continued

| Pixel No. | Input Data Y | Input Data Cr | Input Data Cb | Noise Cr | Noise Cb | Dithered Data Y | Dithered Data Cr | Dithered Data Cb | RGB Data R | RGB Data G | RGB Data B |
|---|---|---|---|---|---|---|---|---|---|---|---|
| 7  | 21 | 128 | 125 | 0  | −1 | 21 | 128 | 124 | 0 | 0 | 0 |
| 8  | 21 | 128 | 125 | +1 | 0  | 21 | 129 | 125 | 0 | 0 | 0 |
| 9  | 22 | 129 | 125 | 0  | +1 | 22 | 129 | 126 | 0 | 0 | 0 |
| 10 | 22 | 129 | 125 | +1 | 0  | 22 | 130 | 125 | 0 | 0 | 0 |
| 11 | 22 | 129 | 124 | 0  | +1 | 22 | 129 | 125 | 0 | 0 | 0 |
| 12 | 23 | 129 | 124 | 0  | 0  | 23 | 129 | 124 | 0 | 0 | 0 |
| 13 | 23 | 129 | 124 | 0  | +1 | 23 | 129 | 125 | 0 | 0 | 0 |
| 14 | 24 | 129 | 124 | 0  | 0  | 24 | 129 | 124 | 0 | 0 | 0 |
| 15 | 24 | 129 | 123 | +1 | +1 | 24 | 130 | 124 | 1 | 0 | 0 |
| 16 | 24 | 129 | 123 | +1 | +1 | 24 | 130 | 124 | 1 | 0 | 0 |
| 17 | 25 | 129 | 123 | 0  | −1 | 25 | 129 | 122 | 1 | 1 | 0 |
| 18 | 25 | 129 | 123 | +1 | −1 | 25 | 130 | 122 | 1 | 0 | 0 |
| 19 | 25 | 129 | 123 | 0  | 0  | 25 | 129 | 123 | 1 | 1 | 0 |
| 20 | 26 | 129 | 122 | −1 | 0  | 26 | 128 | 122 | 1 | 1 | 0 |
| 21 | 26 | 129 | 122 | 0  | +1 | 26 | 129 | 123 | 1 | 1 | 0 |
| 22 | 27 | 129 | 122 | 0  | −1 | 27 | 129 | 121 | 1 | 1 | 0 |
| 23 | 27 | 129 | 122 | +1 | +1 | 27 | 130 | 123 | 1 | 1 | 0 |
| 24 | 27 | 129 | 121 | −1 | +1 | 27 | 128 | 122 | 1 | 1 | 0 |
| 25 | 28 | 129 | 121 | −1 | 0  | 28 | 128 | 121 | 1 | 2 | 0 |
| 26 | 28 | 129 | 121 | −1 | +1 | 28 | 128 | 122 | 1 | 1 | 0 |
| 27 | 29 | 129 | 121 | +1 | +1 | 29 | 130 | 122 | 2 | 1 | 0 |
| 28 | 29 | 129 | 121 | −1 | 0  | 29 | 128 | 121 | 1 | 2 | 0 |
| 29 | 29 | 129 | 120 | 0  | 0  | 29 | 129 | 120 | 2 | 2 | 0 |
| 30 | 30 | 129 | 120 | −1 | −1 | 30 | 128 | 119 | 2 | 2 | 0 |

TABLE 4

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 1 | 0 | 1 | 0 | 1 | 1 | 1 | 1 | 1 | 1 | 1 | 2 | 1 | 2 | 2 | 2 | 2 |
| 2 | 0 | 0 | 0 | 0 | 0 | 0 | 0 | 0 | 0 | 0 | 0 | 0 | 0 | 0 | 1 | 0 | 1 | 1 | 1 | 1 | 1 | 1 | 1 | 1 | 2 | 1 | 2 | 2 | 2 | 2 |
| 3 | 0 | 0 | 0 | 0 | 0 | 0 | 0 | 0 | 0 | 0 | 0 | 0 | 0 | 0 | 1 | 0 | 1 | 1 | 1 | 1 | 1 | 1 | 1 | 1 | 2 | 2 | 2 | 2 | 2 | 2 |
| 4 | 0 | 0 | 0 | 0 | 0 | 0 | 0 | 0 | 0 | 0 | 0 | 0 | 1 | 0 | 1 | 1 | 1 | 1 | 1 | 1 | 1 | 1 | 1 | 2 | 2 | 2 | 2 | 2 | 2 | 2 |
| 5 | 0 | 0 | 0 | 0 | 0 | 0 | 0 | 0 | 0 | 0 | 0 | 1 | 0 | 0 | 1 | 1 | 1 | 1 | 1 | 1 | 1 | 1 | 1 | 2 | 1 | 2 | 2 | 2 | 2 | 1 |
| 6 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 2 | 1 | 2 | 1 |

Thus, although there has been disclosed to this point a particular embodiment for a method of reducing contouring and color shift errors and system therefore, it is not intended that such specific references be considered as limitations upon the scope of this invention except in-so-far as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of avoiding perceptual artifacts in an image display, said method comprising the steps of:

receiving a gamma corrected image signal, said gamma corrected image signal comprised of at least one luminance component and at least one chrominance component;

dithering one or more of said at least one chrominance component to form a dithered image signal, said dithering step operable to reduce image contouring in said dithered image signal;

converting said image signal to an RGB (red, green, blue) image signal;

removing said gamma correction from said RGB image signal; and wherein said RGB image signal is comprised of three digital signal components, said method further comprising the step of reducing the number of data bits of said three signal components of said RGB image signal by dividing each of said digital signal components into a group of most significant bits and a group of least significant bits for each pixel of a pixelated image, wherein said most significant bits are transmitted to a spatial light modulator and said least significant bits are diffused to other pixels in said pixelated image.

2. The method of claim 1 wherein said dithering step comprises adding a random noise signal to one or more of said at least one chrominance components.

3. The method of claim 1, wherein said step of dithering comprises adding a noise signal to said at least one chrominance component of said image signal, wherein said noise signal has a digital value selected from the group of noise values consisting of +1, 0, and −1.

4. The method of claim 1, wherein said step of dithering comprises adding a noise signal to said at least one chrominance component of said image signal, wherein said noise signal has a digital value greater than 1 LSB.

5. A display system comprising:

digitizer for receiving a gamma corrected input image signal, said gamma corrected input image signal comprising at least one luminance component and at least one chrominance component;

at least one noise generator for generating a noise signal; and an adder for adding said noise signal to said at least one chrominance component, wherein contouring in said input image signal is reduced;

a color space conversion circuit receiving said at least one luminance component and said at least one chrominance component with said noise signal added and outputting an RGB image signal having red, green, and blue components;

a degamma circuit for receiving said RGB image signal and removing said gamma correction from said RGB image signal;

an error diffusion filter receiving said RGB image signal and dividing each of said RGB signal components into a group of most significant bits and a group of least significant bits for each pixel of a pixelated image and diffusing said least significant bits to other pixels in said pixelated image;

a spatial light modulator receiving said most significant bits.

6. The display system of claim 5 wherein said noise generator is a random noise generator.

7. The display system of claim 5, wherein said noise generator is a pseudo-random noise generator.

* * * * *